(12) United States Patent
Holderer et al.

(10) Patent No.: US 6,259,571 B1
(45) Date of Patent: Jul. 10, 2001

(54) ADJUSTABLE ASSEMBLY

(75) Inventors: Hubert Holderer, Koenigsbronn; Peter Ruemmer, Oberkochen; Michael Trunz, Pfahlheim; Bernhard Geuppert, Aalen; Thomas Polzer, Oberkochen, all of (DE); Johan Dries, Eindhoven (NL); Hugo Timmers, Hillsboro, OR (US); Albert Post, Weert (NL)

(73) Assignee: Carl-Zeiss-Stiftung, Heindenheim (DE)

( * ) Notice: Subject to any disclaimer, the term of this patent is extended or adjusted under 35 U.S.C. 154(b) by 0 days.

(21) Appl. No.: 09/503,023

(22) Filed: Feb. 14, 2000

(30) Foreign Application Priority Data

Feb. 27, 1999 (DE) .............................. 199 08 554

(51) Int. Cl.$^7$ .................................................. G02B 7/02
(52) U.S. Cl. .......................................... 359/819; 359/822
(58) Field of Search .................................. 359/819, 808, 359/811, 813, 822

(56) References Cited

U.S. PATENT DOCUMENTS

| 4,514,039 | * | 4/1985 | Kawai | 359/827 |
| 5,428,482 | | 6/1995 | Bruning et al. | 359/827 |
| 6,091,554 | | 7/2000 | Sharp et al. | 359/819 |

FOREIGN PATENT DOCUMENTS

| 278 207 A1 | 12/1988 | (DE) . |
| 10-54932 | 8/1996 | (JP) . |

* cited by examiner

*Primary Examiner*—Ricky Mack
(74) *Attorney, Agent, or Firm*—Welsh & Katz, Ltd.

(57) ABSTRACT

An adjustable assembly comprises a base (mount ring 1), an adjustable part (inner ring 3), a lever (tilting lever 5) and a drive (drive element 6). The lever (tilting lever 5) is connected to the base (mount ring 1) and to the adjustable part (inner ring 3) via two elastic solid pivoting joints (7, 8) oriented in parallel. One of the two solid pivoting joints (7) is divided into two pivoting joint parts (7a, 7b), which are arranged such that along their pivoting axis (9) they are offset sideways on either side of the second solid pivoting joint (8).

11 Claims, 3 Drawing Sheets

ADJUSTABLE ASSEMBLY

The invention concerns an adjustable assembly according to the preamble of claim 1 and an optical mount as an embodiment of the adjustable assembly.

With the currently known technique for mounting optical elements, for example lenses, production tolerances at the location where the optical element is connected to the mount and in the flange of the mount lead to straining of the optical element when it is fitted in the mount and when the mounted optical element is fitted into a lens system. If in this case the optical element is connected to the flange of the mount in a statically determined manner with the aid of an intermediate ring or inner ring in the form of a three-point mounting, the inevitable tolerances mentioned above lead to tilting of the optical element with respect to the optical axis.

DD 278 207 A1 discloses an adjusting device for an optical element by which the optical axes of individual optical elements can be aligned with respect to the mechanical axis of a lens system. However, the adjusting elements cannot be used to correct deviations of the optical axes of optical elements from the axis of the lens system with the high accuracy demanded today, as required for example for objects in semiconductor lithography.

JP 10-54 932 shows a connection for a mount with a lever reduction gear in a multi-part configuration.

In U.S. Pat. No. 5,428,482 there is described a connection between a mount and an inner ring on which a lens is mounted as the optical element, the connection taking place by solid pivoting joints arranged such that they are distributed around the circumference.

The present invention is based on the object of providing a stress-isolated assembly, in particular for the technique of mounting an optical element, in which an adjustable part tilted due to production and installation tolerances, such as for example a lens as an optical element, can be tilted back into the desired position by a drive or manipulators.

This object is achieved according to the invention by the features stated in the defining part of claim 1.

An embodiment or a possible application for the adjustable assembly is presented in claim 3.

The solution according to the invention allows a very high transmission ratio to be achieved to a fine degree by the drive in a very small space for the adjustable part, for example an optical element. This takes place by one of the two solid pivoting joints been divided into two pivoting joint parts, which are arranged such that along their pivoting axis they are offset sideways on either side of the second solid pivoting joint. In this way, the distance between the solid pivoting joints which determines the transmission ratio can be significantly reduced.

In particular when used as an optical mount, x/z directional transformations can be produced in this way with a correspondingly great transmission ratio and a resultant high accuracy, this taking place by means of a space-saving construction adapted to the space conditions in the mount ring.

Advantageous refinements and developments of the invention emerge from the subclaims and from the exemplary embodiments described in principle below on the basis of the drawing, in which:

Figure 1:
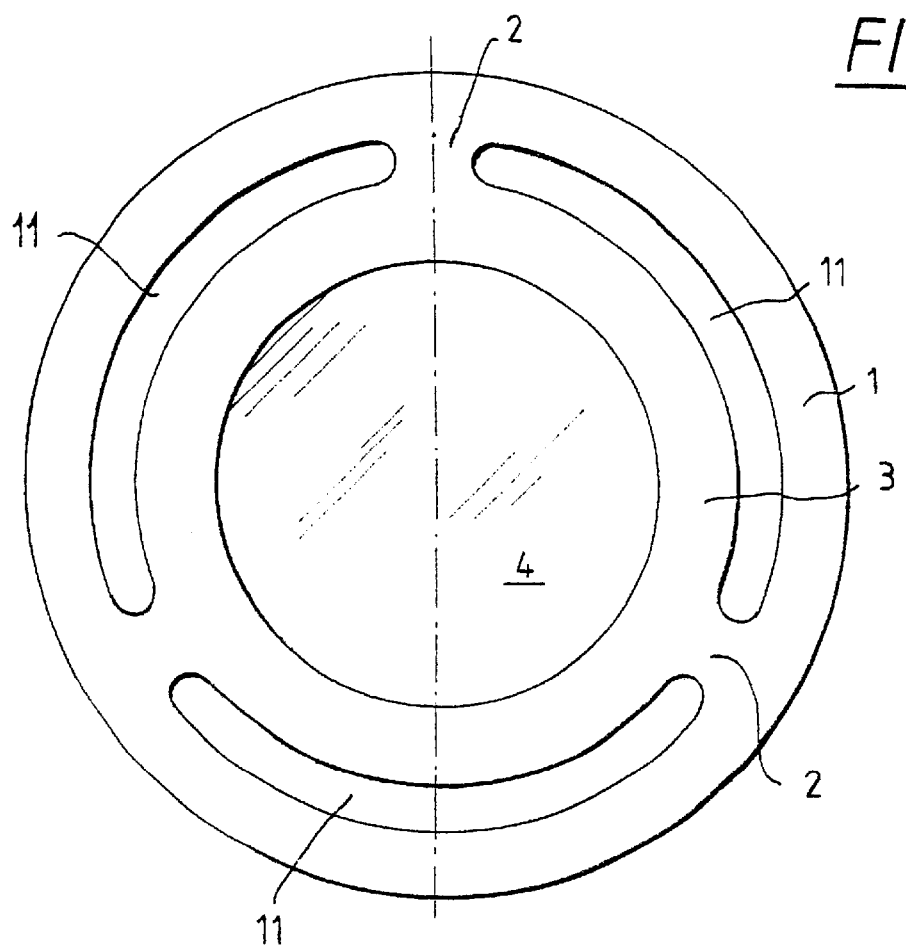
FIG. 1 shows an optical mount as an adjustable assembly in plan view.

The optical mount represented in principle in FIG. 1 has, as the mount, a mount ring 1, which is connected to an inner ring 3 via three solid joints 2. The mount ring 1 and the inner ring 3 may be formed in one piece. The inner ring 3 bears a lens 4 as the optical element.

The connection of the flanged ring 1 to the inner ring 3, on which the lens 4 is fitted, achieves isolation from stress by means of the three solid joints 2.

Figure 2:
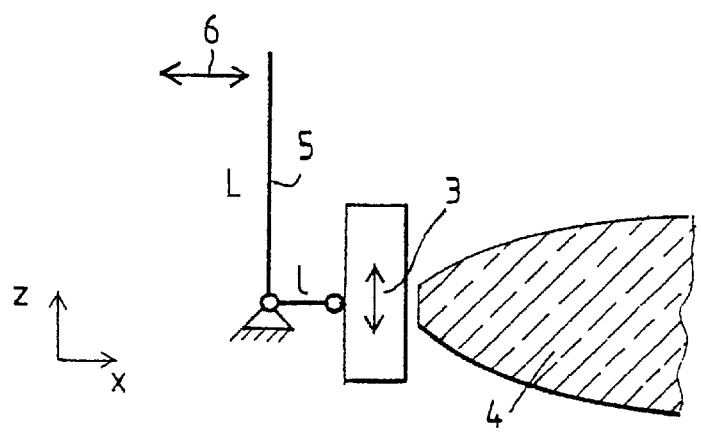
FIG. 2 shows a schematic representation of a solid pivoting joint as a lever gear mechanism with a tilting lever.

A possibility for adjustment is then provided by one or more solid joints 2 being designed in the form of a lever gear mechanism, which essentially comprises a tilting lever 5. As can be seen from FIG. 2, a drive element 6, represented in FIGS. 3 to 5, acts as a manipulator or drive on one end of the tilting lever 5, which has an L shape.

The tilting lever 5 achieves a transmission l/L and a reversal of the direction of movement from the x direction into the z direction (optical axis). As can be seen, the transmission ratio consequently depends, inter alia, on how small the lever arm l can be made. The way in which this can be achieved can be seen from FIGS. 3 to 5, for which purpose one or more of the solid joints 2 schematically represented in FIG. 1 is designed correspondingly as a lever gear mechanism with two solid pivoting joints 7 and 8, the solid pivoting joint 7 being divided into two pivoting joint parts 7a and 7b, which are arranged such that along their pivoting axis 9 they are offset laterally on either side of the solid pivoting joint 8 lying in between. The solid pivoting joints 7 and 8 are oriented in parallel and are appropriately elastic to provide a possibility for adjustment.

The solid pivoting joint 7 with the two pivoting joint parts 7a and 7b is connected on the outside to the mount ring 1. A slit 10 of a U shape represents a separation of the tilting lever 5 from the mount ring 1. At the upper end of the tilting lever 5, the drive element 6 acts on the tilting lever 5 via the slit 10.

The solid pivoting joint 8 is connected on the inside to the inner ring 3 and, on the outside, is articulated on the tilting lever 5 at the lower end, i.e. at the end remote from the point of action of the drive element 6. The isolation of the inner ring 3 from the mount ring 1 is provided by a peripheral slit 11, which is interrupted only by the solid pivoting joints 7 and 8.

Figure 3:
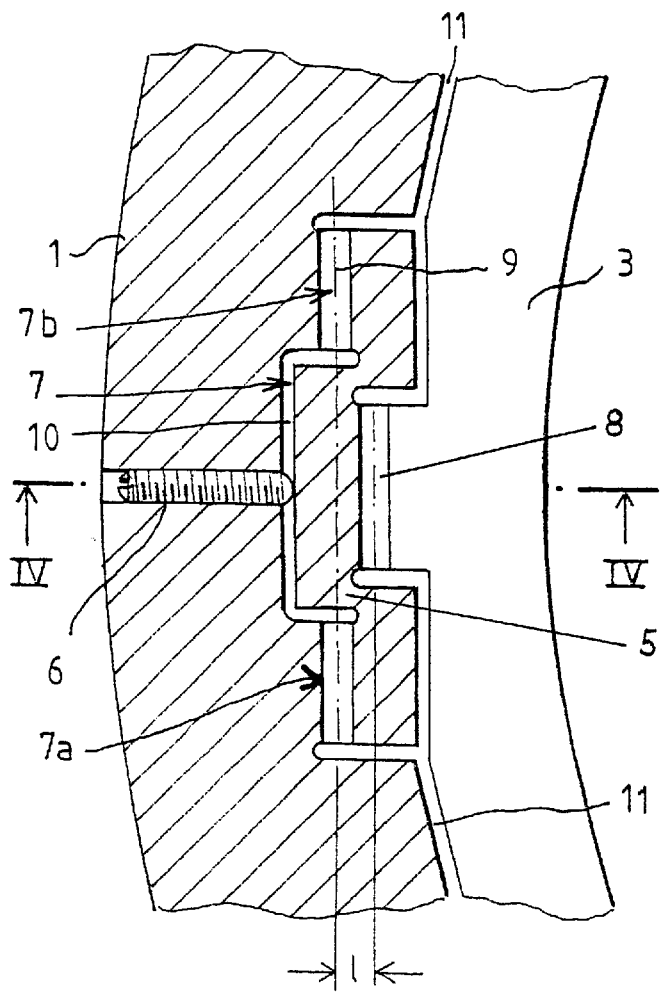
FIG. 3 shows in the form of a detail a plan view of the optical mount according to FIG. 1 with a cross section at the level of an adjusting element of a drive along the line III—III of FIG. 4.
Figure 4:
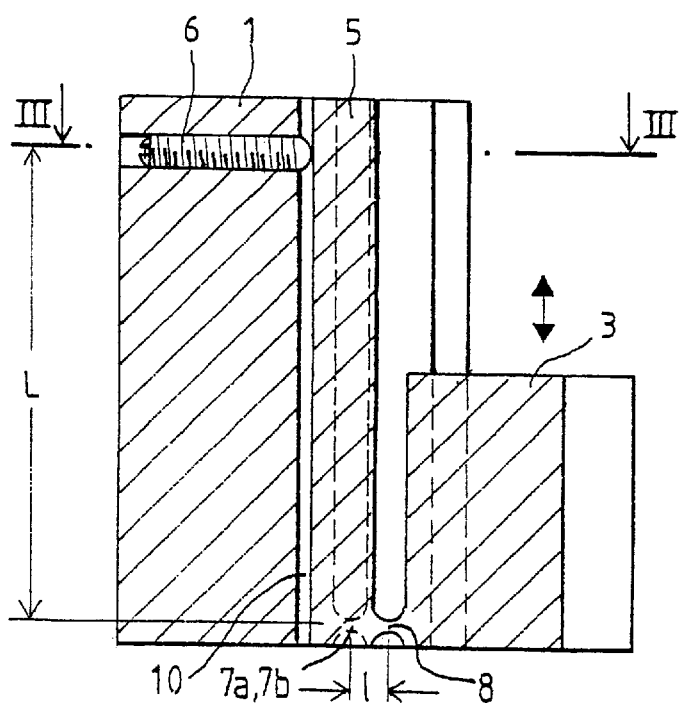
FIG. 4 shows a section along the line IV—IV of FIG. 3.

As can be seen from FIGS. 3 and 4, on account of the division of the solid pivoting joint 7 into the two pivoting joint parts 7a and 7b, the solid pivoting joints 7 and 8 can be moved significantly closer together than would be possible in the case of a non-divided form. The dimension l can be chosen to be correspondingly smaller, so that the transmission ratio l/L becomes very great or sensitive when the drive element 6 is actuated by means of a drive (not shown in any more detail) for displacing the inner ring 3, and consequently the optical element 4, in the z direction.

Figure 5:
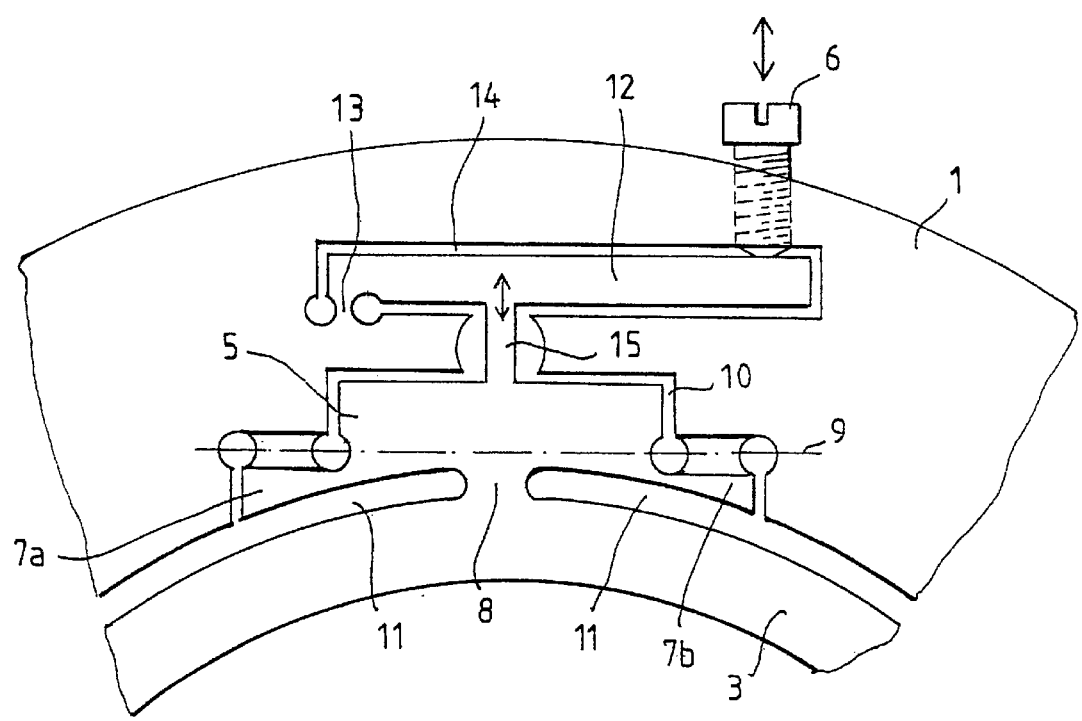
FIG. 5 shows in the form of a detail a plan view of a further embodiment in the region of the solid pivoting joints.

If the transmission ratio is to be increased further, this can be achieved by a refinement as shown in FIG. 5.

As can be seen, in this case a further lever transmission, with a lever 12, is arranged between the drive element 6 and the tilting lever 5. The lever 12 is connected at one end as a mounting location to the mount ring 1 via an elastic solid pivoting joint 13, while otherwise the lever 12 is separated from the mount ring 1 by means of a slit 14. The slit 14 must of course be of such a width that, when actuated by the driving element 6, corresponding movements of the lever 12 are possible. At the end region remote from the end with the solid pivoting joint 13, the drive element 6 acts. The further lever transmission is consequently monolithic or in one piece with the mount 1. The lever is connected to the tilting lever 5 via a connecting location 15 in the form of an intermediate arm. To achieve the increase in the transmission ratio, the connecting location 15 is arranged closer to the end with the solid pivoting joint 13 than to the point of action of the drive element 6. The level of the transmission ratio depends in this case on the distances chosen.

The connecting location 15 may of course also be differently designed. This applies for example to the rotational direction of action and its position.

When the actuating element 6 is actuated, the lever 12 experiences a corresponding deflection and the deflecting force—correspondingly stepped up by the transmisssion—is passed on via the connecting location 15 to the tilting lever 5, whereby a displacement of the optical element 4 takes place in the z direction, i.e. in the direction of the optical axis, in a known way corresponding to the exemplary embodiment as shown in FIGS. 3 and 4. In this way, a tilted optical element can be tilted back again into the desired position.

What is claimed is:

1. An adjustable assembly comprising a base, an adjustable part, at least one lever and a drive, the at least one lever being connected to the base and to the adjustable part via two elastic solid pivoting joints oriented in parallel, wherein one of the two solid pivoting joints (7) is divided into two pivoting joint parts (7a, 7b), which are arranged such that along their pivoting axis (9) they are offset sideways on either side of the second solid pivoting joint (8).

2. The adjustable assembly as claimed in claim 1, wherein the drive (6) acts on a tilting lever (5) arranged between the two pivoting joint parts (7a, 7b) of the divided solid pivoting joint (7).

3. The adjustable assembly as claimed in claim 2, wherein the second solid pivoting joint (8) is located at the end of the tilting lever (5) remote from the point of action of the drive (6).

4. An optical mount, designed as an adjustable assembly as claimed in claim 1, the base being represented by a mount or a part connected to a mount and the adjustable part being represented by an inner ring connected to an optical element, which mount comprises at least one tilting lever (5) and a drive (6) which is arranged in the mount (1) or in a part connected to the mount and by which the inner ring (3) can be tilted about at least one axis.

5. The optical mount as claimed in claim 4, wherein three or four tilting levers (5) and drives (6) are arranged such that they are distributed around the circumference.

6. The optical mount as claimed in claim 4, wherein a further lever transmission is provided between the drive (6) and the solid pivoting joints (7, 8).

7. The optical mount as claimed in claim 6, wherein the further lever transmission is provided with a lever (12), which is mounted in the mount (1) and on which the drive (6) acts.

8. The optical mount as claimed in claim 7, wherein the lever (12) is mounted at one end in the mount (1) and the drive (6) acts at the end remote from the mounting end.

9. The optical mount as claimed in claim 8, wherein the tilting lever (5) is connected to the lever (12) at a connecting location (15) situated between the bearing location of the lever (12) and the point of action of the drive (6).

10. The optical mount as claimed in claim 7, wherein the mounting location of the lever (12) is designed as a third solid joint (13).

11. The optical mount as claimed in claim 6,
wherein the further lever transmission is monolithic with the mount (1).

* * * * *

UNITED STATES PATENT AND TRADEMARK OFFICE
CERTIFICATE OF CORRECTION

PATENT NO.     : 6,259,571 B1
DATED          : July 10, 2001
INVENTOR(S)    : Hubert Holderer, et al.

It is certified that error appears in the above-identified patent and that said Letters Patent is hereby corrected as shown below:

<u>Title page,</u>
Item [73], Assignee: "Carl-Zeiss-Stiftung" should be --Carl-Zeiss Stiftung trading as Carl Zeiss --

Signed and Sealed this

Seventeenth Day of December, 2002

JAMES E. ROGAN
*Director of the United States Patent and Trademark Office*